United States Patent [19]
Alander et al.

[11] Patent Number: 5,486,376
[45] Date of Patent: Jan. 23, 1996

[54] HEAT-RESISTANT CHOCOLATE COMPOSITION AND PROCESS FOR THE PREPARATION THEREOF

[75] Inventors: Jari Alander, Karlshamn; Torbjörn Wärnheim, Bromma; Erwin Lühti, Karlshamn, all of Sweden

[73] Assignee: Karlshamns Oils & Fats AB, Karlshamn, Sweden

[21] Appl. No.: 244,980

[22] PCT Filed: Dec. 18, 1992

[86] PCT No.: PCT/SE92/00876

§ 371 Date: Aug. 2, 1994

§ 102(e) Date: Jun. 17, 1994

[87] PCT Pub. No.: WO93/12664

PCT Pub. Date: Jul. 8, 1993

[30] Foreign Application Priority Data

Dec. 20, 1991 [SE] Sweden ................ 9103783

[51] Int. Cl.⁶ .................................................. A23G 1/00
[52] U.S. Cl. .......................................... 426/660; 426/602
[58] Field of Search ................................. 426/660, 606, 426/607, 602

[56] References Cited

U.S. PATENT DOCUMENTS

| | | | |
|---|---|---|---|
| 4,045,583 | 8/1977 | Jeffery | 426/631 |
| 4,446,166 | 5/1984 | Geddey | 426/660 |
| 4,637,937 | 1/1987 | Terada | 426/584 |
| 4,943,389 | 7/1990 | Weete | 426/662 |
| 5,008,037 | 4/1991 | Weete | 426/662 |
| 5,045,337 | 9/1991 | El-Nokaly | 426/601 |
| 5,104,680 | 4/1992 | Padley | 426/607 |
| 5,120,566 | 6/1992 | Baba | 426/631 |
| 5,149,560 | 9/1992 | Kealey | 426/631 |
| 5,160,760 | 11/1992 | Takemori | 426/660 |
| 5,232,734 | 8/1993 | Takemori | 426/660 |
| 5,244,675 | 9/1993 | Talignani | 426/660 |
| 5,322,704 | 6/1994 | Gaonkar | 426/607 |

FOREIGN PATENT DOCUMENTS

| | | |
|---|---|---|
| 0393327 | 10/1990 | European Pat. Off. . |
| 0397247 | 11/1990 | European Pat. Off. . |
| 0407347 | 1/1991 | European Pat. Off. . |
| 0033718 | 11/1983 | Sweden . |

*Primary Examiner*—Carolyn Paden
*Attorney, Agent, or Firm*—Burns, Doane, Swecker & Mathis

[57] ABSTRACT

A heat-resistant or thermostable chocolate composition is prepared by mixing a chocolate mass, commonly used for preparing chocolate compositions, with a solution mainly consisting of a water-in-oil microemulsion comprising water, fat and an emulsifier, and optionally small amounts of one or more other phases, the water in the microemulsion being present in the form of droplets having a size of 10–1,000 Å.

In a process for preparing the heat-resistant chocolate composition, a chocolate mass commonly used for preparing chocolate compositions is mixed with a solution mainly consisting of a water-in-oil microemulsion comprising water, fat and an emulsifier, and optionally small amounts of one or more other phases, the water in the microemulsion being present in the form of droplets having a size of 10–1,000 Å.

20 Claims, No Drawings

HEAT-RESISTANT CHOCOLATE COMPOSITION AND PROCESS FOR THE PREPARATION THEREOF

The present invention relates to a heat-resistant or thermostable chocolate composition and a process for the preparation thereof.

BACKGROUND OF THE INVENTION

For consumer appeal, a chocolate bar should have a very special consistency. It should snap brittly at room temperature but melt quickly in the mouth, where the temperature is about 35° C. In warmer countries, for instance, it may, however, be difficult to maintain the texture of the chocolate up to the moment the chocolate is to be eaten. The problem then is to keep the brittleness of the chocolate without impairing its other properties.

By the use of various additives, sometimes combined with special processes of preparation, chocolate can be made to keep its texture also at temperatures at which it would otherwise have melted or at least softened excessively. Chocolate thus stabilised is referred to as heat-resistant or tropicalised chocolate.

Heat-resistant chocolate can be produced according to two fundamentally different methods.

In the first method, a certain amount of high-melting fat phase is added to the chocolate composition. The fat crystals in this phase then form a lattice that maintains its structure despite the melting of the remainder of the fatty phase. This method can be optimised, so as not to deteriorate the mouth feel of the chocolate.

In the second method, use is primarily made of the sugar particles in the chocolate mass to form a lattice that maintains its structure when the fatty phase melts. By adding water or other hydrophilic components, the sugar particles can be made to adhere to one another. When the chocolate bar is consumed, the sugar lattice is dissolved, there being no noticeable impairment of the mouth feel as compared with that of ordinary chocolate.

However, the problem associated with such a lattice of sugar particles resides in achieving a uniform, fine distribution of the water when preparing the chocolate. If one does not succeed in doing this, the sugar particles will form large aggregates making the chocolate mass gritty and too viscous, which may have negative effects on the consistency of the end product.

There are various known processes for finely distributing the water in the making of chocolate.

In one process, use is thus made of a water-in-oil emulsion consisting of triglyceride, emulsifier and water (or other hydrophilic additives). EP Patent Specification 0,033,718, for instance, discloses such a process.

Also, a protein-stabilised foam can be used for binding the water in the chocolate composition. EP Patent Application 407,347, for instance, discloses such a process.

In these prior-art processes, the emulsion or the foam is added to the chocolate mass, where it is broken, whereby the water is so distributed that the sugar particles will adhere to one another.

These processes all concern systems that require mechanical energy, such as homogenisation or mixing, to achieve the desired distribution of the water in the chocolate mass. In addition, these systems are not thermodynamically stable, i.e. they tend to separate sooner or later, which requires special process equipment. In addition, the admixture to the chocolate mass, as indeed the entire process, is difficult to perform in a controlled manner. Since it is difficult to foresee how the emulsion or the foam will be broken when admixed to the chocolate mass, it is difficult to control the effect of the water admixture.

The use of emulsions or foams is obviously disadvantageous owing to the size of the water domains in the systems. A water droplet in a water-in-oil emulsion may be from 0.1 μm to 100 μm in size. At the lower limit, a microemulsion is obtained, whereas the upper limit often involves rapid destabilisation of the system and phase separation. The water domains in foam lamellae may be relatively thin (in the order of below 1 μm) but are instead extended in two dimensions. Too large water domains impart undesirable qualities to the chocolate.

SUMMARY OF THE INVENTION

The aim of the present invention is, therefore, to provide a chocolate composition and a process for the preparation thereof obviating the above drawbacks of prior-art compositions and processes.

The invention thus relates to a heat-resistant or thermostable chocolate composition prepared by mixing a chocolate mass, commonly used for preparing chocolate compositions, with a solution mainly consisting of a water-in-oil microemulsion comprising water, fat and an emulsifier, and optionally small amounts of one or more other phases, the water in the microemulsion being present in the form of droplets having a size of 10–1,000 Å.

The invention also concerns a process for preparing a heat-resistant or thermostable chocolate composition, in which a chocolate mass, commonly used for preparing chocolate compositions, is mixed with a solution mainly consisting of a water-in-oil microemulsion comprising water, fat and an emulsifier, and optionally small amounts of one or more phases, the water in the microemulsion being present in the form of droplets having a size of 10–1,000 Å.

DESCRIPTION OF THE PREFERRED EMBODIMENTS

A microemulsion is an isotropic, low-viscosity and thermodynamically stable solution containing at least water, fat and an emulsifier. Microemulsions are well-known in the art and have various applications, such as cleaning, catalysis and tertiary-oil production. It is also well-known to produce microemulsions of food components, e.g. with triglycerides as fatty phase and with monoglycerides, lecithins or sorbitan esters as emulsifiers. However, the actual use of microemulsions for food purposes is limited, among other things because dissolving the triglycerides in the microemulsion involves certain difficulties.

Microemulsions suitably used in the invention preferably contain a vegetable fat or cocoa butter. Use is advantageously made of fat of the common types CBR (Cocoa Butter Replacement), CBE (Cocoa Butter Equivalent), CB (Cocoa Butter) or CBS (Cocoa Butter Substitute), or mixtures thereof. CBR is a non-tempering chocolate fat based on C16/C18 fatty acids, CBE is a temperable chocolate fat based on C16/C18 fatty acids, and CBS is a non-tempering chocolate fat based on C12/C14 fatty acids.

In the invention, use can be made of common food emulsifiers, such as natural or synthetic lecithins, mono-or diglycerides, polyglycerol esters, sucrose esters, sorbitan esters, galactolipides or derivatives thereof. Food legislation often stipulates what emulsifiers may be used.

Microemulsions of these components in water are of so-called L2 type, i.e. solutions in which the emulsifier and the oil form the continuous phase, in which are dissolved droplets of water in the order of 10–1,000 Å.

Microemulsions differ from ordinary emulsions both visually and in respect of stability, by being transparent and by forming spontaneously and reversibly.

In the preparation of chocolate compositions according to the invention, microemulsions are admixed to a chocolate mass commonly used in chocolate compositions. The desired heat resistance is imparted to the chocolate composition by the water in the microemulsions.

The microemulsion is added to the chocolate mass in a weight ratio in the range of 1:5–1:50 of microemulsion to chocolate mass. A preferred weight ratio is 1:10–1:50. If the weight ratio falls below the lower limit, the desired thermostability is not achieved. At the higher limit, on the other hand, the prepared product may not taste as it should. Also, food legislation may restrict the permissible amount of emulsifier and other additives in the end product.

The quantitative ratio in the microemulsion between emulsifier, fat and water may vary within wide limits and depends on the properties of the components used.

The microemulsion is mixed with the chocolate mass, and chocolate bars may then be moulded in conventional manner. After solidification, the chocolate bar will essentially retain its shape upon heating to 35°–40° C. At this temperature, the chocolate bar without any microemulsion added would have melted.

A solution which mainly consists of a microemulsion, but also contains small amounts of one or more other phases (e.g. dispersed liquid crystal, a water-continuous phase), and which consequently has a lower content of emulsifier, will also be satisfactory. Further, a minor amount (at most about 10% by weight) of the fat and/or the emulsifier may be present in crystallised form in the microemulsion.

The main requirement placed on the microemulsion is that it should yield a water content sufficient to make the sugar particles adhere to one another in the chocolate mass. In known chocolate compositions comprising water-in-oil emulsions or protein-stabilised foams, the lowest concentration of water present is a total of about 1%. It is likely that this lower limit can be further reduced by the use of microemulsions, since the water in these is more finely distributed than in the known emulsions and foams.

The heat resistance of the chocolate product can be enhanced by using comparatively high-melting emulsifiers. It has further been found that the emulsifier also contributes to the thermostability of the end product when the content of emulsifier is sufficiently high. The effect of the emulsifier on the thermostability is, however, difficult to foresee, since the melting point of an emulsifier largely depends on the water content, i.e. on whether the emulsifier is hydratised or not. For e.g. an emulsifier of monoglyceride type, a melting point of the pure monoglyceride of about 40°–60° C. is required for it to contribute to thermostability at 35° C.

As mentioned above, the total content of emulsifier in the end product is often restricted by food legislation. In Sweden, for instance, the highest content of emulsifier allowed at present is a total of 2%. Since lecithin is often added in an amount of up to 0.5% already at an earlier stage of the manufacturing process, the amount of emulsifier subsequently added must not exceed 1.5%.

Using microemulsions for introducing finely distributed water in chocolate compositions has the special advantage of making it very easy, in terms of process technique, to "tropicalise" the chocolate. Unlike ordinary emulsions and foams, a microemulsion can form without extensive mechanical processing. As a rule, microemulsions form spontaneously, but the process may be speeded up by agitation. Another advantage of microemulsions is that they re-form spontaneously if broken for some reason or other. A broken emulsion, on the other hand, has to be mechanically processed to be restored.

The invention will be illustrated in more detail below with the aid of non-restricting Examples.

EXAMPLE 1

To 250 g chocolate mass consisting of
30.0% chocolate fat (CBR)
8.0% cocoa mass
45.7% sugar
16.0% cocoa powder
0.3% lecithin
was added 25 ml of a microemulsion consisting of
60% monoglyceride having an iodine number of 40
15% water
25% chocolate fat (CBR) at 40° C. After solidification at 20° C., the chocolate retained its shape when heated to >35° C. for 1 h. This is superior to reference chocolate without additives, which completely loses its shape under these conditions.

EXAMPLE 2

To 250 g chocolate mass consisting of
6.5% chocolate fat (CBE)
18.5% cocoa butter
9.0% cocoa mass
42.7% sugar
8.0% low-fat milk powder
15.0% skimmed milk powder
0.3% lecithin
was added 25 ml of a microemulsion consisting of
60% monoglyceride having an iodine number of 65
15% water
25% chocolate fat (CBE) at 30° C. After solidification at 8°–10° C. and storage for 1 week, the chocolate retained its shape when heated to 40° C. for 3 h. This is superior to a reference chocolate without any additives, which completely loses its shape under the same conditions.

EXAMPLE 3

To 250 g chocolate mass consisting of
30.0% chocolate fat (CBR)
8.0% cocoa mass
45.7% sugar
16.0% cocoa powder
0.3% lecithin
was added 16 g of a microemulsion consisting of
60% mono-diglyceride having an iodine number of 40
20% water
20% chocolate fat (CBR) at 38° C. After solidification at 8°–10° C., the chocolate retained its shape when heated to >35° C. for 3 h. This is superior to a reference chocolate without any additives, which completely loses its shape under such conditions.

EXAMPLE 4

To 500 g chocolate mass consisting of
30.0% chocolate fat (CBR)
8.0% cocoa mass
45.7% sugar
16.0% cocoa powder
0.3% lecithin
was added 55 ml of a microemulsion consisting of
50% monoglyceride having an iodine number of 50
25% water
10% lecithin
15% chocolate fat (CBR) at 38° C. After solidification at 10° C. and storage for 1 week, the chocolate retained its shape when heated to 40° C. for 3 h. This is superior to a reference chocolate without any additives, which completely loses its shape under similar conditions.

EXAMPLE 5

To 250 g chocolate mass consisting of
30.0% chocolate fat (CBR)
8.0% cocoa mass
45.7% sugar
16.0% cocoa powder
0.3% lecithin
was added 8 g of a microemulsion consisting of
60% monoglyceride having an iodine number of 40
20% water
20% chocolate fat (CBR) at 40° C. After solidification at 8°–10° C., the chocolate retained its shape when heated to 35° C. for 3 h. This is superior to a reference chocolate without any additives, which completely loses its shape under identical conditions.

EXAMPLE 6

To 500 g chocolate mass consisting of
9.0% cocoa mass
18.5% cocoa butter
6.5% chocolate fat (CBE)
8.0% low-fat milk powder
15.0% whole milk powder
42.7% sugar
0.3% lecithin
was added 50 g of microemulsion consisting of
65% monoglyceride having an iodine number of 105
15% water
20% chocolate fat (CBE) at 29° C. After solidification at 10° C., the chocolate retained its shape when heated to 40° C. for 1 h. This is superior to reference chocolate without any additives, which completely loses its shape under these conditions.

EXAMPLE 7

To 250 g chocolate mass consisting of
30.0% chocolate fat (CBR)
8.0% cocoa mass
45.7% sugar
16.0% cocoa powder
0.3% lecithin
was added 16 g of a microemulsion consisting of
50% monoglyceride having an iodine number of 105
15% water
15% citric acid esters of mono-diglycerides
20% chocolate fat (CBR) at 39° C. After solification at 10° C., the chocolate retained its shape when heated to 35° C. for 1 h. This is superior to a reference chocolate without any additives, which completely loses its shape under the same conditions.

EXAMPLE 8

To 500 g chocolate mass consisting of
30.0% chocolate fat (CBR)
8.0% cocoa mass
45.7% sugar
16.0% cocoa powder
0.3% lecithin
was added 16 g of a microemulsion consisting of
65% monoglyceride having an iodine number of 40
15% water
25% chocolate fat (CBR) at 40° C. After solidification at 10° C., the chocolate retained its shape when heated to 35° C. for 1 h. This is superior to a reference chocolate without any additives, which completely loses its shape under identical conditions.

We claim:

1. A heat-resistant composition prepared by mixing a chocolate mass with a solution consisting essentially of a water-in-oil microemulsion comprising water, fat and an emulsifier wherein the water of the microemulsion is present in the form of droplets having a size of 10–1,000 Å.

2. A chocolate composition as set forth in claim 1, wherein the weight ratio of the microemulsion-containing solution to the chocolate mass in the composition lies in the range of 1:5–1:50.

3. A chocolate composition as set forth in claim 2, wherein the fat in the microemulsion is a vegetable fat or cocoa butter.

4. A chocolate composition as set forth in claim 3, wherein the emulsifier is chosen from natural or synthetic lecithins, mono- or diglycerides, polyglycerol esters, sucrose esters, sorbitan esters, galactolipides or derivatives thereof.

5. A chocolate composition as set forth in claim 2, wherein the emulsifier is chosen from natural or synthetic lecithins, mono- or diglycerides, polyglycerol esters, sucrose esters, sorbitan esters, galactolipides or derivatives thereof.

6. A chocolate composition as set forth in claim 1 wherein the fat in the microemulsion is a vegetable fat or cocoa butter.

7. A chocolate composition as set forth in claim 6, wherein the fat is selected from the group consisting of cocoa butter replacement, cocoa butter equivalent, cocoa butter, cocoa butter substitute, and mixtures thereof.

8. A chocolate composition as set froth in claim 7, wherein the emulsifier is chosen from natural or synthetic lecithins, mono- or diglycerides, polyglycerol esters, sucrose esters, sorbitan esters, galactolipides or derivatives thereof.

9. A chocolate composition as set forth in claim 7, wherein the weight ratio of the microemulsion-containing solution to the chocolate mass in the composition lies in the range of 1:5–1:50, and the emulsifier is selected from the group consisting of natural or synthetic lecithins, mono- or diglycerides, polyglycerol esters, sucrose esters, sorbitan esters, galactolipides and derivatives thereof.

10. A chocolate composition as set forth in claim 6, wherein the emulsifier is chosen from natural or synthetic lecithins, mono- or diglycerides, polyglycerol esters, sucrose esters, sorbitan esters, galactolipides or derivatives thereof.

11. A chocolate composition as set forth in claim 1, wherein the emulsifier is chosen from natural or synthetic lecithins, mono- or diglycerides, polyglycerol esters, sucrose esters, sorbitan esters, galactolipides or derivatives thereof.

12. A process for preparing a heat-resistant or thermo-stable chocolate composition consisting essentially of mixing a chocolate mass, commonly used for preparing chocolate compositions, with a solution mainly consisting of a water-in-oil microemulsion comprising water, fat and an emulsifier wherein the water in the microemulsion is present in the form of droplets having a size of 10–1,000 Å.

13. A process as set forth in claim 12, wherein said microemulsion is mixed with the chocolate mass in a weight ratio lying in the range of 1:5–1:50.

14. A process as set forth in claim 13, wherein said fat in the microemulsion is a vegetable fat or cocoa butter.

15. A process as set forth in claim 13, wherein said emulsifier is selected from the group consisting of natural or synthetic lecithins, mono- or diglycerides, polyglycerol esters, sucrose esters, sorbitan esters, galactolipides and derivatives thereof.

16. A process as set forth in claim 12, wherein said fat in the microemulsion is a vegetable fat or cocoa butter.

17. A process as set forth in claim 16, wherein the fat is selected from the group consisting of cocoa butter replacement, cocoa butter equivalent, cocoa butter, cocoa butter substitute and mixtures thereof.

18. A process as set forth in claim 14, wherein said emulsifier is selected from the group consisting of natural or synthetic lecithins, mono- or diglycerides, polyglycerol esters, sucrose esters, sorbitan esters, galactolipides and derivatives thereof.

19. A process as set forth in claim 9, wherein the emulsifier is chosen from natural or synthetic lecithins, mono- or diglycerides, polyglycerol esters, sucrose esters, sorbitan esters, galactolipides or derivatives thereof.

20. A process as set forth in claim 12, wherein said emulsifier is selected from the group consisting of natural or synthetic lecithins, mono- or diglycerides, polyglycerol esters, sucrose esters, sorbitan esters, galactolipides and derivatives thereof.

* * * * *